United States Patent
Bruneau

(10) Patent No.: US 10,902,636 B2
(45) Date of Patent: Jan. 26, 2021

(54) METHOD FOR ASSISTING THE LOCATION OF A TARGET AND OBSERVATION DEVICE ENABLING THE IMPLEMENTATION OF THIS METHOD

(71) Applicant: NEXTER SYSTEMS, Roanne (FR)

(72) Inventor: Philippe Bruneau, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 2 days.

(21) Appl. No.: 16/344,292

(22) PCT Filed: Oct. 12, 2017

(86) PCT No.: PCT/FR2017/052808
§ 371 (c)(1),
(2) Date: Apr. 23, 2019

(87) PCT Pub. No.: WO2018/078236
PCT Pub. Date: May 3, 2018

(65) Prior Publication Data
US 2019/0272649 A1    Sep. 5, 2019

(30) Foreign Application Priority Data

Oct. 24, 2016 (FR) ..................... 16 01535

(51) Int. Cl.
| | | |
|---|---|---|
| *G06T 7/73* | (2017.01) |
| *G01S 5/16* | (2006.01) |
| *G02B 27/01* | (2006.01) |
| *G06T 11/60* | (2006.01) |

(Continued)

(52) U.S. Cl.
CPC .............. *G06T 7/74* (2017.01); *G01C 21/165* (2013.01); *G01S 5/163* (2013.01); *G02B 27/017* (2013.01);

(Continued)

(58) Field of Classification Search
CPC ... G06T 7/74; G06T 7/73; G06T 11/60; G06T 2207/30212; G06T 2207/30252;

(Continued)

(56) References Cited

U.S. PATENT DOCUMENTS 5,557,685 A * 9/1996 Schlossers ............ G01S 3/7864
                                                382/107
8,831,277 B1   9/2014 Hoke et al.
(Continued)

FOREIGN PATENT DOCUMENTS

| EP | 0949513 A2 | 10/1999 |
| EP | 1451652 B1 | 4/2005 |
| EP | 2942717 A1 | 11/2015 |

OTHER PUBLICATIONS

United States Naval Academy, Fundamentals of Naval Weapons Systems, Reference Frames and Coordinate Systems, URL: https://fas.org/man/dod-101/navy/docs/fun/part18.htm, Mar. 4, 2017 (Year: 2017).*

(Continued)

*Primary Examiner* — Phuc N Doan
(74) *Attorney, Agent, or Firm* — Oliff PLC

(57) ABSTRACT

A method for assisting the location of a target for a first user equipped with an observation device includes an augmented reality observation device associated with a first user reference frame. According to this method, a reference platform associated with a master reference frame is positioned on the terrain, the reference platform is observed from at least one camera worn by the first user, the geometry of the observed platform is compared with a numerical model of same and the orientation and location of the first user reference frame is deduced with respect to the master reference frame. It is then possible to display, on an augmented reality observation device, at least one virtual reticle locating the target.

10 Claims, 2 Drawing Sheets

Figure 1:
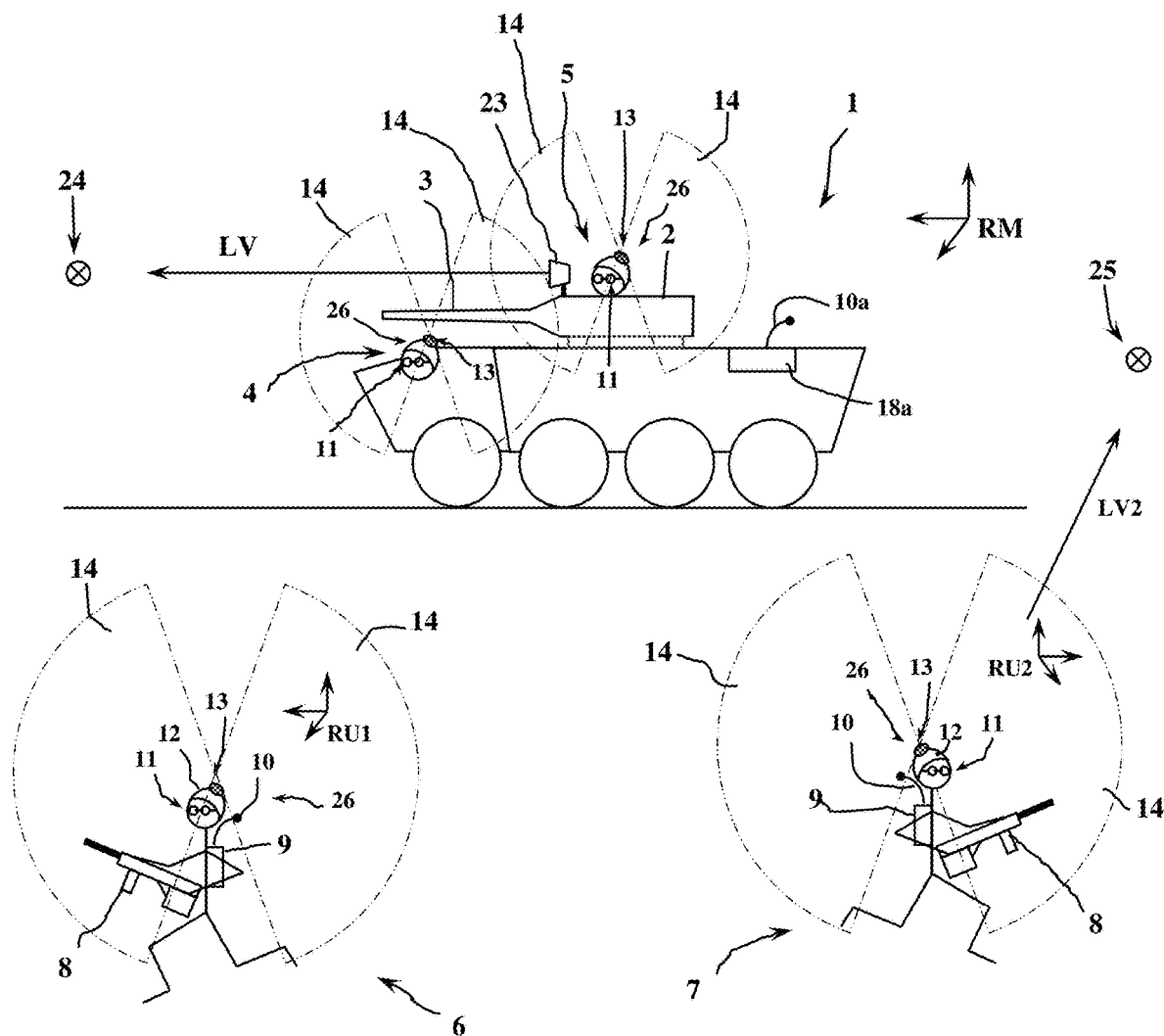

(51) Int. Cl.
G01C 21/16 (2006.01)
G06F 3/03 (2006.01)
G06F 1/16 (2006.01)
G06F 3/01 (2006.01)

(52) U.S. Cl.
CPC ......... *G02B 27/0172* (2013.01); *G06F 1/163* (2013.01); *G06F 3/011* (2013.01); *G06F 3/0304* (2013.01); *G06T 7/73* (2017.01); *G06T 11/60* (2013.01); *G02B 2027/014* (2013.01); *G02B 2027/0138* (2013.01); *G06T 2207/30212* (2013.01); *G06T 2207/30252* (2013.01)

(58) Field of Classification Search
CPC ..... G01C 21/165; G01S 5/163; G02B 27/017; G02B 27/0172; G02B 2027/0138; G02B 2027/014; G06F 1/163; G06F 3/011; G06F 3/0304
See application file for complete search history.

(56) References Cited

U.S. PATENT DOCUMENTS

| | | | | |
|---|---|---|---|---|
| 8,854,282 | B1* | 10/2014 | Wong | G06F 3/14 345/7 |
| 2007/0276590 | A1 | 11/2007 | Leonard et al. | |
| 2013/0018582 | A1* | 1/2013 | Miller | G01C 17/38 701/501 |
| 2013/0030700 | A1* | 1/2013 | Miller | G08G 1/20 701/500 |
| 2016/0026253 | A1* | 1/2016 | Bradski | H04N 13/344 345/8 |
| 2016/0033268 | A1* | 2/2016 | Abernathy | G01S 17/86 356/4.01 |
| 2016/0119610 | A1* | 4/2016 | Houvener | G03B 35/20 348/36 |
| 2018/0120061 | A1* | 5/2018 | Sammut | F41G 3/06 |
| 2019/0042575 | A1* | 2/2019 | Ashkenazi | H04W 4/023 |
| 2019/0130622 | A1* | 5/2019 | Hoover | G06T 11/60 |
| 2019/0272649 | A1* | 9/2019 | Bruneau | G02B 27/017 |

OTHER PUBLICATIONS

Feb. 9, 2018 International Search Report issued in International Patent Application PCT/FR2017/052808.
Feb. 9, 2018 Written Opinion issued in International Patent Application PCT/FR2017/052808.
Jul. 31, 2017 French Search Report and Written Opinion issued in French Patent Application 1601535.

* cited by examiner

METHOD FOR ASSISTING THE LOCATION OF A TARGET AND OBSERVATION DEVICE ENABLING THE IMPLEMENTATION OF THIS METHOD

The invention relates to the technical field of methods making it possible to assist with the location of a target for a user equipped with an observation means.

An observation means in particular relates to optical or digital viewing means allowing a user to observe a scene. Such devices in particular include visors, binoculars, optical goggles, augmented reality systems equipping a helmet or goggles.

It is already traditional to superimpose, on the vision of a target, embedded information providing information on the observed object.

Patents EP 2,942,717 and EP 1,451,652 thus show augmented reality observation devices used to perform maintenance tasks with or without assistance from a remote operator.

Generally, the location of the observation means (goggles or helmet) relative to the observed scene is done using markers positioned on the objects to be analyzed. Patent EP 949,513 describes such a technique.

Patent US 2007/0276590 also describes the placement on the field of specific markers that send their coordinates to the observer.

A difficulty arises then when the observer moves in an unknown environment in which no points of reference can be positioned.

It has also been proposed to equip the user with an observation device made up of a helmet carrying means for observing the environment and performing a constant analysis of the latter in order to perform an evaluation of the movements of the helmet by correlating successive captured images. U.S. Pat. No. 8,831,277 describes such a helmet. The difficulty then lies in the computing performance in an environment that may vary quickly. Another difficulty lies in the precision of the spatial locations of the helmet that can be obtained.

In a military or peacekeeping context, it is in fact necessary to locate the orientation of the helmet or goggles very precisely in order to allow the dynamic positioning of images or points of reference in the observation means, for example when it is necessary to position a target to be neutralized.

The location angles must then have a precision of around several milliradians.

This is difficult to guarantee in all cases from an analysis of the immediate environment and without fixed points of reference positioned on the field. It then becomes necessary to equip the helmet with an inertial platform to be able to measure its spatial orientations continuously.

However, such a technique is cumbersome and costly and cannot be adopted.

It is the aim of the invention to propose a method to assist with the location of a target for a user, in which method the location is done simply and quickly.

The method according to the invention is applicable in a military context, and it then assists with the communication of operational information on the battlefield between different operators and between the infantrymen and the crew of a vehicle. The method according to the invention is also applicable in peacekeeping contexts for which it may be necessary to communicate operational information to operators located at a distance from a vehicle in a field of operations.

Thus, the invention relates to a method for assisting the location of a target for a first user equipped with an observation device comprising an augmented reality observation means secured to a support plate and coupled to a computing means and associated with communication means, the method being characterized in that, a reference platform being positioned on the field and having a spatial orientation reference frame called master reference frame, and a first user spatial orientation reference frame called first user reference frame being defined by design of the observation device, and associated with the observation device of the first user, the method comprises the following steps:

sending the first user, from the platform or by a second user and via the communication means, the coordinates of the target in the master reference frame;

observing, by the first user, the reference platform from at least one camera that is secured to the plate carried by the first user and that supports the augmented reality observation means;

comparing the geometry of the platform thus observed to a digital model of the platform, which has been placed in a memory of the computing means, to deduce therefrom the orientation and the location of the first user reference frame relative to the master reference frame;

computing the coordinates of the target in the first user reference frame;

displaying, on the augmented reality observation means of the first user, at least one virtual reticle making it possible to locate the target.

According to one particular embodiment, the coordinates of the target in the master reference frame may be sent from the platform that is equipped with at least one master observation means, coupled to a target designation means, the means making it possible to determine the coordinates of the target in the master reference frame.

According to another embodiment, the coordinates of the target in the master reference frame may be sent by a second user who will be equipped with an observation device coupled to a computing means and associated with communication means, the second user having means allowing him to designate a target.

Advantageously, the second user is equipped with an observation device including an augmented reality observation means similar to that of the first user, a second user spatial orientation reference frame called second user reference frame being defined by design of the observation device, and which is associated with the observation device of the second user, in which method:

the second user determines the coordinates of a target to be designated in the second user reference frame;

the second user observes the reference platform from at least one camera carried by the second user, the camera being secured to the plate carried by the second user and which supports the augmented reality observation means of the second user;

the geometry of the platform thus observed is compared to a digital model of the platform that is placed in a memory of the computing means to deduce therefrom the orientation and the location of the second user reference frame relative to the master reference frame;

the coordinates of the target to be designated in the master reference frame are computed;

the second user sends the first user the coordinates of the target in the master reference frame.

According to one embodiment, the platform is made up of a vehicle.

The digital model of the platform may be a model of at least part of the external geometry of the vehicle.

The digital model of the platform may be or may incorporate at least part of a model of the internal geometry of the vehicle.

The invention also relates to an observation device for a first user, the device including an augmented reality observation means coupled to a computing means associated with communication means, the device making it possible to carry out the method according to the invention. This device is characterized in that it comprises a plate that carries, rigidly fastened, at least one camera making it possible to observe the space around the first user and to acquire images of the platform, the computing means incorporating a memory in which a digital model of the platform is placed and algorithms making it possible to determine the orientation and the location, relative to a master reference frame associated with said platform, of a first spatial orientation reference frame of the observation device of the user, called first user reference frame, and to convert the coordinates of an image or a target from the master reference frame into the first reference frame and vice versa, the augmented reality observation means including at least one projection collimator and at least one semitransparent blade which are secured to the plate, wherein each collimator can display the image on a semitransparent blade, the plate constituting a rigid mechanical support making it possible to fix the relative positions and angular orientations of the camera(s), the collimator(s) and the semitransparent blade(s).

Advantageously, the observation device may comprise two semitransparent blades each associated with a collimator.

Figure 2:
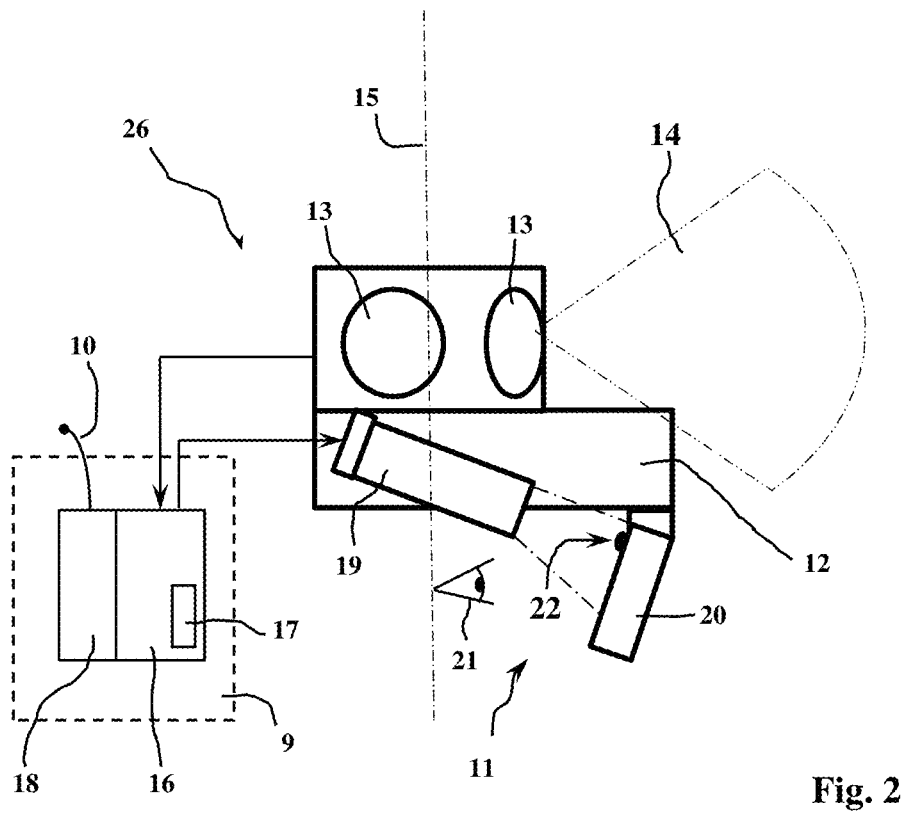
Figure 3:
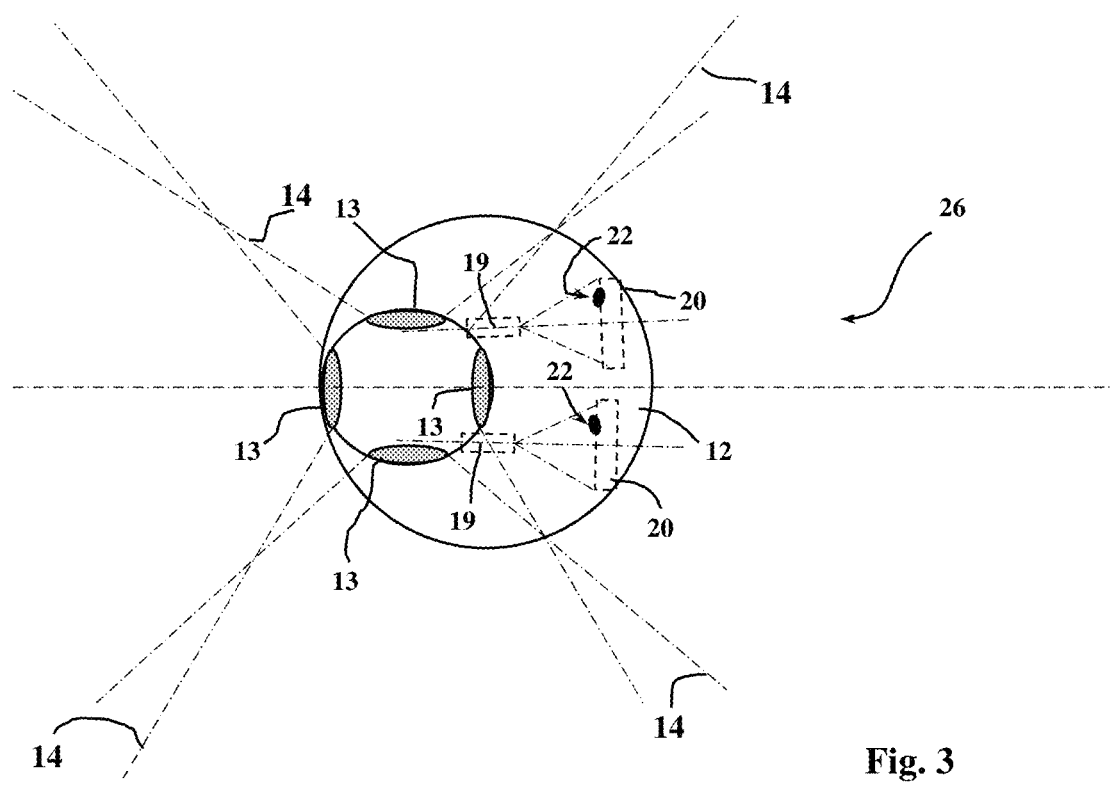

The invention will be better understood upon reading the following description of one specific embodiment, the description being done in reference to the appended drawings, in which:

FIG. 1 schematically shows the implementation of the invention in the field;

FIG. 2 more precisely shows an observation device according to the invention;

FIG. 3 is a schematic top view of the observation device according to FIG. 2.

FIG. 1 shows a military operations (or peacekeeping) theater in which a vehicle 1 moves, which here is an armored vehicle with wheels equipped with a turret 2 carrying a weapons system 3.

FIG. 1 shows the driver 4 of the vehicle with his head outside the passenger compartment as well as another occupant 5 of the vehicle, such as the vehicle chief or the shooter, who also has his head outside the turret 2. Two armed infantrymen 6 and 7 are also moving in the field.

Each infantryman is equipped with an individual weapon 8 and is wearing a casing 9 that contains a portable computing means associated with communication means, an antenna 10 of which is shown schematically. The communication means allow each infantryman 6, 7 to communicate with the other infantrymen as well as the occupants of the vehicle 1.

Such communication means are well known. They generally use Hertzian waves and combine voice and data exchanges.

Each infantryman is also equipped with an observation device 26 including an augmented reality observation means 11 that is shown schematically here in the form of augmented reality goggles.

These augmented reality observation means are coupled to the computing means placed in the casing 9 and they in particular make it possible to show, superimposed on the view of the field, images or information relative to the mission in progress, information sent by the other infantrymen or by the occupants of the vehicle.

According to the invention, the observation device 26 includes an augmented reality observation means 11 that is secured to a support plate 12, the plate also carrying, fastened rigidly, at least one camera 13 making it possible to observe the space around the user in question.

FIG. 1 schematically shows the support plate 12 by a helmet worn by each user. The camera(s) 13 is (are) fastened at the apex of the helmet.

The camera or the group of cameras is defined so as to guarantee an observation field 14 of said camera(s) 13 with an angular coverage of substantially 360° around the user. It is possible to choose wide-field cameras (therefore with a wide-angle lens), but it is also possible to choose cameras with a narrower lens angle; it is then necessary to increase the number of cameras to guarantee the desired angular coverage (360°).

For technological reasons, this 360° coverage can only be effective at a given distance from the user (for example at least one meter). In particular, when the user wears several cameras 13 distributed around the helmet, there will be blind spots, but only close to the user, the fields of the cameras intersecting at a distance to provide the 360° coverage. Concretely, the fields are chosen to be wide enough so that a camera 13 always provides the observation of at least part of a reference platform here made up of the vehicle 1, as will be described later.

In FIG. 1, the angular sectors 14 shown are a section of the actual spatial coverage, which has a substantially spherical shape and therefore indeed covers 360° around the user. The blind spots oriented upward and downward are not operationally bothersome. One can see in FIG. 1 that the driver 4 and the chief 5 of the vehicle are also equipped with observation devices 26 that include augmented reality observation means 11, the devices being identical to those of the infantrymen 6 and 7.

FIGS. 2 and 3 show, in more detail, the structure of the observation device 26 according to the invention that is secured to the helmet.

In these figures, the helmet is not shown, but we have identified the plate 12 that provides for the support for the observation means 11 and the cameras 13. According to the illustrated example, the plate 12 carries four cameras 13, regularly angularly distributed around a vertical axis 15, so as to guarantee an overlap over 360° of their observation fields.

We have also schematically shown, in FIG. 2, the casing 9 containing the computing means 16 incorporating a memory 17, and the communication means 18.

In order to simplify the description, the figures show computing means 16 housed in a casing 9 carried by the infantryman. It is of course understood that the computing means could be structurally arranged elsewhere than in a dedicated housing 9, for example they could be carried by the plate 12 secured to the helmet (the same is true for the communication means 18). They could even be incorporated into the electronic circuits associated with the cameras 13. These computing means remain "portable" because they are in all cases carried by the user in question.

The augmented reality observation means 11 includes at least one projection collimator 19 and at least one semitransparent blade 20 that are secured to the plate 12.

Traditionally, the collimator 19 makes it possible to display an image on the semitransparent blade 20 that is associated with it.

The observation device 26 shown here includes two semitransparent blades 20, one positioned in front of each of the user's eyes 21. It also includes two projection collimators 19, one in front of each blade 20. The blades 20 are fastened rigidly relative to the plate 12 and the same is true for the collimators 19. Using two semitransparent blades makes it possible to provide a stereoscopic vision of the space and the images projected by the two collimators will be adapted so as to give the user an image in relief.

Traditionally, each collimator 19 therefore makes it possible to display, on the semitransparent blade 20 that is associated with it, information provided by the computing means 16 and that completes the vision the user has of his ambient space.

In particular, and in accordance with the method according to the invention, the collimators 19 will make it possible to project, on the blades 20, an image that here is a virtual reticle 22 that will make it possible to locate a target.

The plate 12 makes up a rigid mechanical support that makes it possible to fix the relative positions and angular orientations of the cameras 13, collimators 19 and semitransparent blades 20.

This plate 12 therefore embodies an orientation reference frame of the observation means 11 of the user in the space, or user reference frame (RU).

It is of course possible to display, on the semitransparent blades 20, images other than those of a virtual reticle, for example enlarged images in relief of a target and that are sent by the platform, for example to facilitate field reconnaissance operations, or information associated with an element or object present on the field.

The aim of the method according to the invention is to make it possible to send the user, dynamically and via the communication means 18, location information of an objective (for example a target) without it being necessary to know the precise coordinates of the observation direction of the user.

To that end and according to the invention, we will consider a reference platform, here the vehicle 1, that is positioned on the field and that therefore has an orientation spatial reference frame RM hereinafter referred to as master reference frame (see FIG. 1).

Furthermore, by design of the observation device 26, and as a result of the rigidity of the connections between the cameras 13 and the observation means 11 that is guaranteed by the plate 12, it will be possible to define, for a first user (for example the infantryman 6), a first user spatial orientation reference frame, called first user reference frame RU1. This first user reference frame is associated with the observation device 26 of the first user 6 (see FIG. 1), therefore also his observation means 11.

The platform or vehicle 1 is equipped with at least one master observation means 23 that is coupled to a target designation means (here incorporated into the master observation means 23).

The target designation means are well known by the One Skilled in the Art. They generally comprise a telemeter, for example laser, and means for computing the orientation of a line of sight LV relative to the master reference frame RM. These means make it possible to determine the coordinates of a target 24 in the master reference frame RM.

These coordinates are then usable by all of the viewing screens present in the vehicle 1 and it is possible to position a sighted target on these screens whose orientation is known relative to the vehicle 1.

According to the invention, one first sends (step 80) the first user 6, via the communication means 18, the coordinates of the target 24 in the master reference frame RM. Of course, the vehicle is itself equipped with communication means (for example using the Hertzian waves) that allow it to send these coordinates to the first user. FIG. 1 schematically shows, by the block 18a, the communication means of the vehicle associated with an antenna 10a.

In parallel, and continuously, the camera(s) 13 carried by the first user 6 make it possible to observe the reference platform 1.

Appropriate algorithms make it possible to convert the images of the reference platform 1 into an instantaneous digital model of said platform (step B).

An actual digital model of the platform has also been placed in the memory 17 of the computing means 16 carried by the first user. This digital model comes from the computer-assisted design of the platform. It is a three-dimensional model that is only expunged from the data of the platform that are not visible by the user (hidden forms).

This digital model of course incorporates the dimensional elements of the actual vehicle, which will make it possible to determine a distance between the user and the vehicle from the image of a vehicle of a given size.

One therefore proceeds (step C) with a comparison of the geometry of the platform 1 thus observed (instantaneous digital model) with the reference model that has been placed in a memory 17 of the portable computing means 16.

This comparison makes it possible, using comparison algorithms, to deduce therefrom the orientation of the axes of the first user reference frame RU1 relative to the master reference frame RM (angles of the axes) and the location of the first reference frame RU1 relative to the master reference frame RM (position of the center of the first reference frame RU1 in the master reference frame RM). This comparison implements image comparison algorithms known by the acronym SLAM (Simultaneous Localization And Mapping). These algorithms are well known by the One Skilled in the Art and it is not necessary to describe them in detail. It will be noted that they conduct comparisons of images by implementing filtering techniques (Kalman filtering, probabilistic filtering) in order to determine the changes in orientation of the axes necessary to obtain the best correlation. It is thus possible at any moment to determine the coordinates of the first user reference frame RU1 in the master reference frame RM and it is also possible to determine the orientations of the axes of the first user reference frame RU1 relative to the master reference frame RM.

It is next easy (step D) to calculate the coordinates of the target 24 in the first user reference frame RU1. This makes it possible to display, on the augmented reality observation means 11 of the first user, a virtual reticle 22 making it possible to locate the target 24.

Of course, it will be necessary first to calibrate the observation means 11 of the observation device 26 to the morphological characteristics of a user (spacing of the eyes, distance from the eyes to the semi-reflective blades, distances between the blades and the cameras). The digital model derived from the CAD is precise enough to guarantee robustness of the location, even from a partial view of the platform 1 by the user. This model also makes it possible not to be disrupted by the presence of obstacles between the user and the platform, obstacles partially and temporarily concealing the platform (for example other users inserted in the field of view).

The invention thus makes it possible to completely do away with the use of an inertial platform secured to the plate 12. The location precision is excellent, since the precision of the digital models derived from CAD makes it possible to determine the coordinates of the master line of sight LV with an angular deviation of less than several milliradians.

The invention allowing the location of any user relative to the vehicle 1, it is also possible to designate a target 25 no longer from the vehicle 1 itself, but from another user, for example the infantryman 7, who is also equipped with an observation device 26 according to the invention, therefore including an observation means 11 coupled to a portable computing means 16 and associated with communication means 18. This second user 7 is also equipped with means allowing him to designate a target, for example a laser designator or a passive means implementing triangulation methods.

The second user 7 will thus determine the coordinates of his own line of sight LV2 to a target 25 in his own user reference frame RU2.

This second user 7 knows the orientation and location of his reference frame RU2 in the master reference frame RM because he observes the vehicle 1 at all times using his cameras 13 and the algorithms guarantee, as described previously by image correlation, the location and the orientation of the reference frame RU2 relative to the reference frame RM.

The second user 7 will therefore be able to send the first user 6 the coordinates of the new target 25 in the master reference frame RM.

The first user 6 will next carry out the method according to the invention to compute, as previously described, the coordinates of the new target 25 in his own reference frame RU1.

In all cases, what is essential is the possibility for each user to observe the vehicle 1 using his cameras 13. He can next locate himself in the space and the master reference frame RM serves as a reference for all of the users who have disembarked and are distributed around the vehicle. The performance of the current optical systems thus allows a location up to distances of around several tens of meters from the vehicle with the desired location precision.

According to one feature of the invention, it is not necessary for the user to see the entire vehicle. It suffices for him to have a significant part thereof in his field of vision for the SLAM algorithms to be able to be carried out.

As shown in FIG. 1, both the driver 4 and the chief (or shooter) 5 are also equipped with observation devices 26 including augmented reality observation means 11 identical to those of the infantrymen 6 and 7. Such an arrangement allows a crewmember also to view, on his observation means 11, the target(s) that are designated by a user, whether the crewmember is in the passenger compartment (and observes the field through optical channels) or has his head out.

In order to guarantee continuity in the designation functions irrespective of the in or out position of a user occupying the vehicle, will be incorporated in the memory, not only a digital model of the external geometry of the platform, but also a digital model, at least partial, of the internal geometry of the vehicle. The model of the internal geometry will be limited for the most part to the internal geometry of the passenger compartment seen by the operator, excluding the parts of the vehicle not accessible by sight, in order to lighten the digital model placed in memory.

The invention claimed is:

1. A method for assisting location of a target for a first user equipped with an observation device comprising an augmented reality observation means secured to a support plate and coupled to a computing means and associated with communication means, wherein, a reference platform being positioned on a field and having a spatial orientation reference frame called master reference frame, and a first user spatial orientation reference frame called first user reference frame being defined by design of the observation device, and associated with the observation device of the first user, the method comprises the following steps:

sending the first user, from the reference platform or by a second user and via the communication means, coordinates of the target in the master reference frame;

observing, by the first user, the reference platform from at least one camera that is secured to the plate carried by the first user and that supports the augmented reality observation means;

comparing a geometry of the reference platform thus observed to a digital model of the reference platform, which has been placed in a memory of the computing means, to deduce therefrom an orientation and a location of the first user reference frame relative to the master reference frame;

computing coordinates of the target in the first user reference frame; and displaying, on the augmented reality observation means of the first user, at least one virtual reticle making it possible to locate the target.

2. The method for assisting location of a target according to claim 1, in which method the coordinates of the target in the master reference frame are sent from the reference platform that is equipped with at least one master observation means, coupled to a target designation means, the master observation means and the target designation means making it possible to determine the coordinates of the target in the master reference frame.

3. The method for assisting location of a target according to claim 1, in which method the coordinates of the target in the master reference frame are sent by a second user who is equipped with an observation device coupled to a computing means and associated with communication means, the second user having target designation means allowing the second user to designate a target.

4. The method for assisting location of a target according to claim 3 and for which the second user is equipped with an observation device including an augmented reality observation means similar to that of the first user, a second user spatial orientation reference frame called second user reference frame being defined by design of the observation device, and which is associated with the observation device of the second user, in which method:

the second user determines the coordinates of a target to be designated in the second user reference frame;

the second user observes the reference platform from at least one camera carried by the second user, the camera being secured to the plate carried by the second user and which supports the augmented reality observation means of the second user;

the geometry of the reference platform thus observed is compared to a digital model of the reference platform that is placed in a memory of the computing means to deduce therefrom an orientation and a location of the second user reference frame relative to the master reference frame;

the coordinates of the target to be designated in the master reference frame are computed; and the second user sends the first user the coordinates of the target in the master reference frame.

5. The method for assisting location of a target according to claim 1, wherein the reference platform is made up of a vehicle.

6. The method for assisting location of a target according to claim 5, wherein the digital model of the reference platform is a model of at least part of an external geometry of the vehicle.

7. The method for assisting location of a target according to claim 5, wherein the digital model of the reference platform is or incorporates at least part of a model of an internal geometry of the vehicle.

8. The method for assisting location of a target according to claim 6, wherein the digital model of the reference platform is or incorporates at least part of a model of an internal geometry of the vehicle.

9. An observation device for a first user, the device including an augmented reality observation means coupled to a computing means associated with communication means, the device comprises a plate that carries, rigidly fastened, at least one camera making it possible to observe the space around the first user and to acquire images of a reference platform, the computing means incorporating a memory in which a digital model of the reference platform is placed and algorithms making it possible to determine an orientation and a location, relative to a master reference frame associated with the reference platform, of a first spatial orientation reference frame of the observation device of the first user, called first user reference frame, and to convert coordinates of an image or a target from the master reference frame into the first reference frame and vice versa, the augmented reality observation means including at least one projection collimator and at least one semitransparent blade which are secured to the plate, wherein each collimator can display the image on a semitransparent blade, the plate constituting a rigid mechanical support making it possible to fix the relative positions and angular orientations of the camera(s), the collimator(s) and the semitransparent blade(s).

10. The observation device according to claim 9, further comprises two semitransparent blades each associated with a collimator.

* * * * *